United States Patent
Holzhausen

(10) Patent No.: US 8,489,257 B2
(45) Date of Patent: Jul. 16, 2013

(54) METHOD AND DEVICE FOR MOVEABLE TAIL TRIMMING IN AN AIRCRAFT

(75) Inventor: Torsten Holzhausen, Bargstedt (DE)

(73) Assignee: Airbus Operations GmbH, Hamburg (DE)

( * ) Notice: Subject to any disclaimer, the term of this patent is extended or adjusted under 35 U.S.C. 154(b) by 949 days.

(21) Appl. No.: 12/450,089

(22) PCT Filed: Mar. 17, 2008

(86) PCT No.: PCT/EP2008/002100
§ 371 (c)(1),
(2), (4) Date: Sep. 10, 2009

(87) PCT Pub. No.: WO2008/110384
PCT Pub. Date: Sep. 18, 2008

(65) Prior Publication Data
US 2010/0042271 A1    Feb. 18, 2010

(30) Foreign Application Priority Data

Mar. 15, 2007  (DE) .......................... 10 2007 012 425

(51) Int. Cl.
*G05D 1/08*  (2006.01)
(52) U.S. Cl.
USPC ............................... 701/4; 244/178; 244/181
(58) Field of Classification Search
USPC .............. 701/3–6, 15, 16, 116, 124; 244/180, 244/181, 89, 99.2, 178, 177, 76 R, 124; 318/584
See application file for complete search history.

(56) References Cited

U.S. PATENT DOCUMENTS

| | | | | |
|---|---|---|---|---|
| 2,974,908 A * | 3/1961 | Platt | ............................... | 244/178 |
| 3,643,146 A * | 2/1972 | Ferguson et al. | ............. | 318/565 |
| 3,682,417 A * | 8/1972 | Burklund et al. | ............. | 244/180 |
| 3,719,878 A * | 3/1973 | Ferguson et al. | ............. | 318/565 |
| 3,743,221 A * | 7/1973 | Lykken et al. | ................. | 244/180 |
| 3,848,833 A * | 11/1974 | Rauschelbach | ............... | 244/177 |
| 4,021,009 A * | 5/1977 | Baker et al. | ................... | 244/180 |
| 4,032,093 A * | 6/1977 | Bonne et al. | .................. | 244/180 |
| 4,127,248 A | 11/1978 | Boone et al. | | |
| 4,129,275 A * | 12/1978 | Gerstine et al. | ............... | 244/181 |
| 4,304,375 A * | 12/1981 | Builta et al. | ............... | 244/17.13 |

(Continued)

OTHER PUBLICATIONS
International Search Report.

*Primary Examiner* — Khoi Tran
*Assistant Examiner* — Adam Mott
(74) *Attorney, Agent, or Firm* — Collard & Roe, P.C.

(57) ABSTRACT

The invention relates to a method for actuating an adjusting drive for adjusting an elevator (12) and an adjusting drive for adjusting a moveable tail (23) provided with the steps: Generation of an elevator command to actuate the elevator adjusting drive; Calculating a moveable tail command (IHC1) for actuating the moveable tail adjusting drive in such a manner that the moveable tail (23) is tracked to the elevator input signal (10); Depending on the adjusting states of the elevator (12) and/or the moveable tail (23) or flight states, retaining the adjusting state of the moveable tail adjusting drive or actuating the moveable tail adjusting drive with a moveable tail command (IHCMD) for changing the adjusting state of the moveable tail (23), during actuation of the elevator adjusting drive with an elevator command for changing the adjusting state of the elevator (23) and in the event of a deviation from the calculated moveable tail command (IHC1) and the commanded moveable tail command (IHCMD), acting upon the elevator command to compensate for retention of the adjusting state of the moveable tail adjusting drive and a control device for carrying out the method.

24 Claims, 11 Drawing Sheets

U.S. PATENT DOCUMENTS

| | | | |
|---|---|---|---|
| 4,347,572 A * | 8/1982 | Berwick et al. | 701/6 |
| 4,382,282 A * | 5/1983 | Graham et al. | 701/11 |
| 4,577,275 A * | 3/1986 | Adams et al. | 701/5 |
| 4,590,475 A * | 5/1986 | Brown | 340/966 |
| 4,676,460 A * | 6/1987 | Hagy et al. | 244/76 R |
| 4,825,375 A * | 4/1989 | Nadkarni et al. | 701/3 |
| 4,849,900 A * | 7/1989 | Blight et al. | 701/7 |
| 5,112,009 A * | 5/1992 | Farineau | 244/181 |
| 5,365,446 A * | 11/1994 | Farineau et al. | 701/3 |
| 5,692,708 A * | 12/1997 | Coleman et al. | 244/178 |
| 6,082,672 A * | 7/2000 | Audren | 244/99.8 |
| 2003/0088341 A1* | 5/2003 | Jones et al. | 701/3 |
| 2005/0218262 A1* | 10/2005 | Boe et al. | 244/87 |
| 2005/0242235 A1* | 11/2005 | Delaplace et al. | 244/75.1 |
| 2006/0060699 A1* | 3/2006 | Boe et al. | 244/87 |
| 2006/0144996 A1* | 7/2006 | Carl et al. | 244/99.2 |
| 2010/0042271 A1* | 2/2010 | Holzhausen | 701/4 |
| 2010/0222944 A1* | 9/2010 | Blechen | 701/6 |

\* cited by examiner

METHOD AND DEVICE FOR MOVEABLE TAIL TRIMMING IN AN AIRCRAFT

CROSS REFERENCE TO RELATED APPLICATIONS

This application is the National Stage of PCT/EP2008/002100 filed on Mar. 17, 2008, which claims priority under 35 U.S.C. §119 of German Application No. 10 2007 012 425.4 filed on Mar. 15, 2007. The international application under PCT article 21 (2) was published in English.

The invention relates to a method and a device for moveable tail trimming in an aircraft.

From document US-A-4 127 248 a method for actuating an adjusting drive for adjusting an elevator and an adjusting drive for adjusting a moveable trail is known.

In civilian passenger and transport aircraft, the pitching moment balance, that is the moments acting about the transverse axis which effect a pitching movement of the aircraft, is usually compensated by moveable tail trimming. For this purpose a trimmable moveable tail is provided which can be adjusted over a certain trimming range independently of the elevator.

In permanent automatic trimming, compensation for pitching moments is effected by a combined movement of elevator and moveable tail. In this case, the movement of the elevator which is usually regulated by an actuating device in the form of an actuator drive at a high regulating speed is in advance of the movement of the moveable tail which is regulated by means of a spindle drive at lower speed. Typical regulating speeds are about 35°/s to 40°/s for the elevator and about 0.5°/s to 2.0°/s regulating speed for the moveable tail. If a perturbation occurs in the pitching moment balance or a change in the vertical trajectory guidance is instructed, the fast-running elevator initially takes over the production of the additional aerodynamic forces required for this purpose. The slower-running moveable tail runs in an equidirectionally directed movement behind the elevator, whereby the generation of the aerodynamic additional forces for the flight manoeuvre or the trimming is increasingly shifted from the elevator to the moveable tail, the further the moveable tail follows the elevator. Once the required overall efficiency of the forces is achieved, the elevator stops and then runs in an oppositely directed movement to the moveable tail running therebehind. The force component of the elevator decreases further and that of the moveable tail increases further.

In this case, two regulating surfaces are thus controlled so that they run towards one another until their chords (component centre lines) form a straight line. The position of the elevator (relative to the moveable tail) has again returned to 0° and the aerodynamic additional force is now generated substantially by the moveable tail. The position of the moveable tail is now different from that previously.

Minor turbulence or gusts are compensated by an automatic trimming function. Accordingly the elevator and moveable tail move permanently to and fro with small deflections. Small adjusting deflections are likewise made for small flight path changes or even for larger ones if they proceed suitably slowly. Said permanent to and fro movements lead to wear on a specific position of the moveable tail adjusting device, that is, typically the trimming spindle, and also at the other moving parts.

According to the flight phase, the absolute positioning of the moveable tail depends substantially on the position of the centre of gravity (loading state, fuel consumption), the actual flap position (for producing high lift during take-off and landing) and the thrust moment of the engines (engine lever times engine thrust). During cruising which is usually the longest flight phase, the position of the moveable tail moves in a relatively narrow range of adjustment over longer time intervals. Since this range lies at the same position on the trimming spindle in most flying missions, increased wear should be expected there.

The object of the invention is to provide a method and a control device for moveable tail trimming which can be adapted flexibly to the requirements of the flight situation and/or other aircraft systems. It is furthermore the object of the invention is to provide a method and a control device for moveable tail trimming by which means wear on the moveable tail drive is minimised.

This object is achieved by the features of the dependent claims. Further embodiments and further developments are specified in the dependent claims which relate back to these.

The term "moveable tail trimming" should be understood so generally here that it relates equally well to movements of the moveable tail to correct for perturbation of the pitching moment balance and to movements of the moveable tail for changing the vertical path guidance.

The adjusting angle of the moveable tail or the elevator is generally understood as the angle in relation to a common reference line, e.g. the aircraft longitudinal axis or reference plane.

An advantage of the method according to the invention and the device according to the invention is that the total of all the movement steps undertaken for a particular movement sequence and therefore the wear is smaller than in conventional moveable tail trimming.

According to the invention, a method for actuating an adjusting drive for adjusting an elevator and an adjusting drive for adjusting a moveable tail is provided with the steps:
  Generation of an elevator command to actuate the elevator adjusting drive;
  Calculating a moveable tail command for actuating the moveable tail adjusting drive in such a manner that the moveable tail is tracked to the calculated elevator signal input;
  Depending on the adjusting states of the elevator and/or the moveable tail or flight states, retaining the adjusting state of the moveable tail adjusting drive or actuating the moveable tail adjusting drive with a moveable tail command for changing the adjusting state of the moveable tail,
  during actuation of the elevator adjusting drive with an elevator command for changing the adjusting state of the elevator and in the event of a deviation from the calculated moveable tail command and the commanded moveable tail command, acting upon the elevator command to compensate for retention of the adjusting state of the moveable tail adjusting drive, to achieve neutral aerodynamic effectiveness.

In a further embodiment, the retention of the adjusting state of the moveable tail adjusting drive or the actuation of the moveable tail adjusting drive with a moveable tail command is made depending on the adjusting states of the elevator on the basis of a range for the moveable tail command, the limits whereof are related to adjusting states of the elevator. The limits of the range for the moveable tail command can be made or calculated depending on the calculated moveable tail command.

In a further embodiment, the limits of the range for the moveable tail command are formed from a first threshold value and a second threshold value,
  wherein in one time interval, an actuation of the moveable tail adjusting drive with an moveable tail command for changing the adjusting state of the moveable tail is only made when the absolute magnitude of the difference between the calculated moveable tail command and the commanded moveable tail command relevant to this time interval or an actual adjusting state of the moveable tail exceeds a first threshold value, and wherein the moveable tail adjusting drive is actuated with an moveable tail command in such a manner that the adjusting state of the moveable tail does not change if a value derived from the calculated moveable tail command and/or the commanded moveable tail command relevant to this time interval or an actual adjusting state of the moveable tail is below the second threshold value.

The first and/or second threshold value can be a constant value which corresponds to a difference angle. Further, the first and/or second threshold value is a value derived from flight status variables and/or the adjusting state of the elevator occurring in the time interval and/or the adjusting state of the moveable tail.

In these embodiments, the moveable tail adjusting drive can be actuated with an moveable tail command in such a manner that the adjusting state of the moveable tail does not change if the absolute magnitude of the difference between the calculated moveable tail command and the commanded moveable tail command relevant to this time interval or an actual adjusting state of the moveable tail is below the second threshold value.

In a further embodiment of the invention, the value compared with the second threshold value is a distance between the adjusting position of the moveable tail and the instantaneous adjusting position of the moveable tail or a value derived from this distance so that the second threshold value is fallen below when the moveable tail falls below an angular distance to the moveable tail. Alternatively, the value compared with the second threshold value is the regulating speed of the moveable tail and/or the elevator or a value derived from this so that the threshold value is fallen below when the moveable tail falls below a predetermined regulating speed.

In particular, according to the method according to the invention for actuating a moveable tail and an elevator of an aircraft in response to a moveable tail command, the moveable tail is actuated in steps and whilst shifting higher-frequency movement components in the moveable tail command onto the elevator, a pre-command of non-commanded moveable tail command components is effected via the elevator. It can be provided that the moveable tail command is compared with a predefined threshold value and is only output to the moveable tail as an actual moveable tail command if it exceeds the threshold value, and if it is below the predefined threshold value, an elevator command to compensate for the difference DiH offset=IHC1−IHCMD, of an elevator action corresponding thereto is output to the same via a pre-control. In this embodiment, in particular in an aircraft having an elevator with a high regulating speed and a moveable tail with a low regulating speed, it can furthermore be provided that an elevator command to actuate the elevator and a moveable tail command to actuate the moveable tail are generated, wherein the moveable tail command is calculated from the elevator signal and is output to the slowly running moveable tail and the overall effect of elevator and moveable tail correspond to the elevator signal and during an adjusting time given by the regulating speed of the slowly running moveable tail, elevator and moveable tail are brought into an end position matched to one another, wherein the calculated moveable tail command is compared with a predefined threshold value and is only output to the moveable tail as an actual moveable tail command if it exceeds the threshold value and if it is below the predefined threshold value, an elevator command to compensate for the difference, DiH offset=IHC1−IHCMD, of an elevator action corresponding thereto is output to the same via a pre-control. The comparison of the calculated elevator command with the threshold value can be made in particular by a predefined hysteresis or step function.

In the aforesaid exemplary embodiments it can be provided that if a moveable tail command is not output, a pre-command is output to the elevator which generates an elevator deflection which corresponds in its action to the action of the non-commanded moveable tail deflection. In this case, the pre-command for the elevator can be generated by forming the difference between the calculated moveable tail command and the moveable tail command actually output to the moveable tail and weighting this difference with a quantity representing the ratio of the adjusting surface efficiencies of moveable tail to elevator. The ratio of the adjusting surface efficiencies can be calculated in particular taking into account one or more of the following parameters: flight speed, absolute moveable tail position, flap position of the aircraft high lift system, pitch position of the aircraft.

In the aforesaid embodiment of the method according to the invention, it can be provided that, starting from an initial value corresponding to the instantaneous moveable tail position, the calculated moveable tail command IHC1 is compared with the predefined threshold value, that if the threshold value is exceeded, the comparison of moveable tail command and threshold value is deactivated and the moveable tail is adjusted in response to the output moveable tail command IHCMD in the direction of an end position corresponding to the calculated moveable tail command and that the comparison of the moveable tail command IHC1 and the predefined threshold value is activated again starting from an initial value then corresponding to the instantaneous moveable tail position if this instantaneous moveable tail position is approximately approaching the calculated end position, at least apart from a predefined dimension. In this case, it can be provided that the comparison of the moveable tail command IHC1 and the threshold value is activated again when the adjusting rate of the moveable tail actuation has dropped below a predefined fraction of the maximum adjusting rate.

The method can be configured in particular in such a manner that the elevator and the moveable tail are set such that their mutual position effects an arching of the overall profile produced by moveable tail and elevator, causing an uplift/down force in the sense of the supplied elevator signal.

According to the invention, there is also provided a device for actuating the moveable tail in an aircraft or a control device for actuating an adjusting drive for adjusting an elevator and an adjusting drive for adjusting a moveable tail based on an elevator control variable for carrying out the method according to the invention. This device is functionally set up in such a manner that this actuates the moveable tail in a stepped manner in response to the moveable tail command IHC1 and whilst shifting higher-frequency movement components in the moveable tail command to the elevator, provides a pre-command of non-commanded moveable tail command components via the elevator. Furthermore, function modules for carrying out exemplary embodiments of the method according to the invention are implemented in the device.

The method and device for moveable tail trimming according to the invention can be used independently of the type of drives.

Exemplary embodiments of the method and device for moveable tail trimming according to the invention are described hereinafter with reference to the appended figures, which show:

FIG. 1 a block diagram to illustrate the method for moveable tail trimming in an aircraft according to one exemplary embodiment of the invention;

Figure 2:
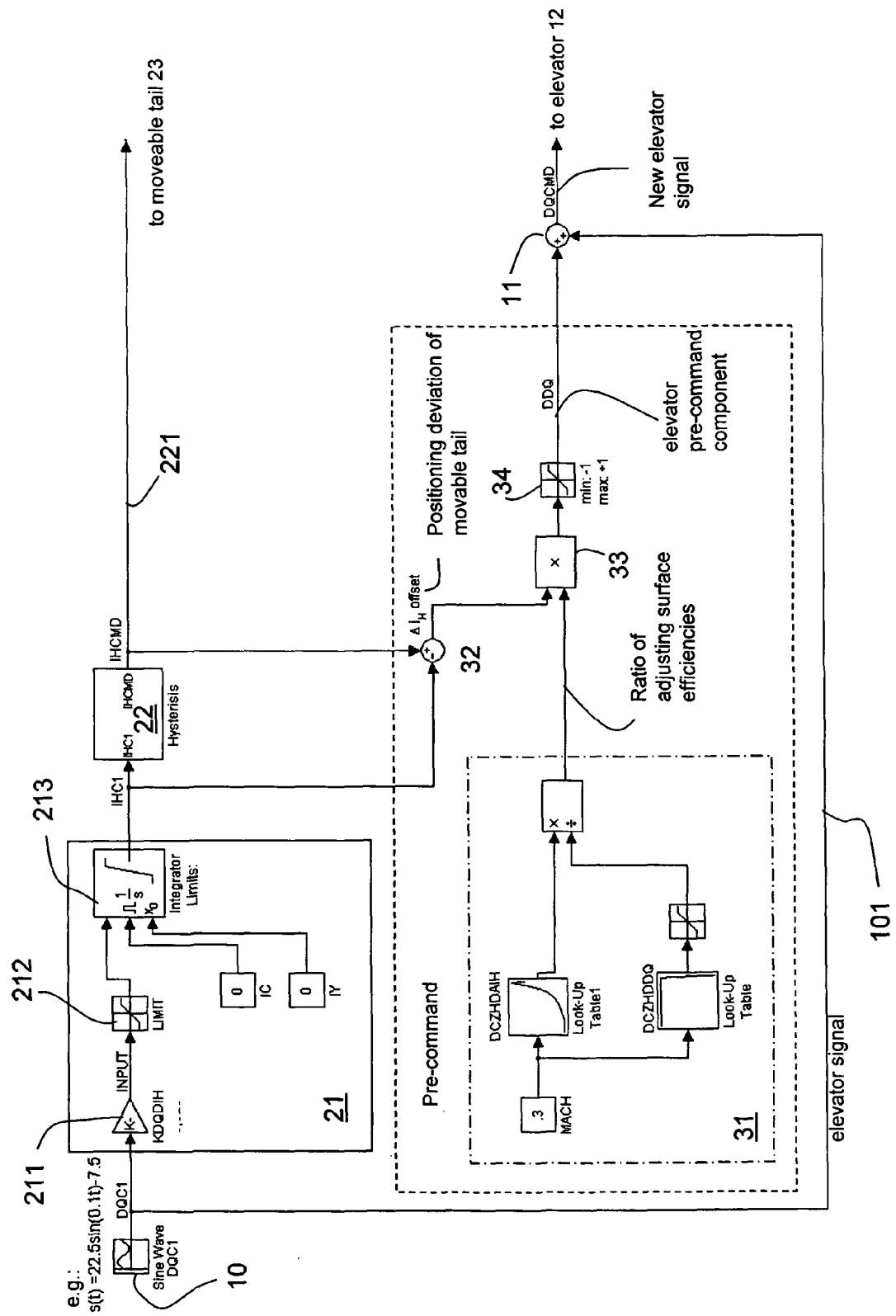
FIG. 2 is a schematic circuit diagram to illustrate a device for moveable tail trimming in an aircraft according to one exemplary embodiment of the invention.
Figure 4:
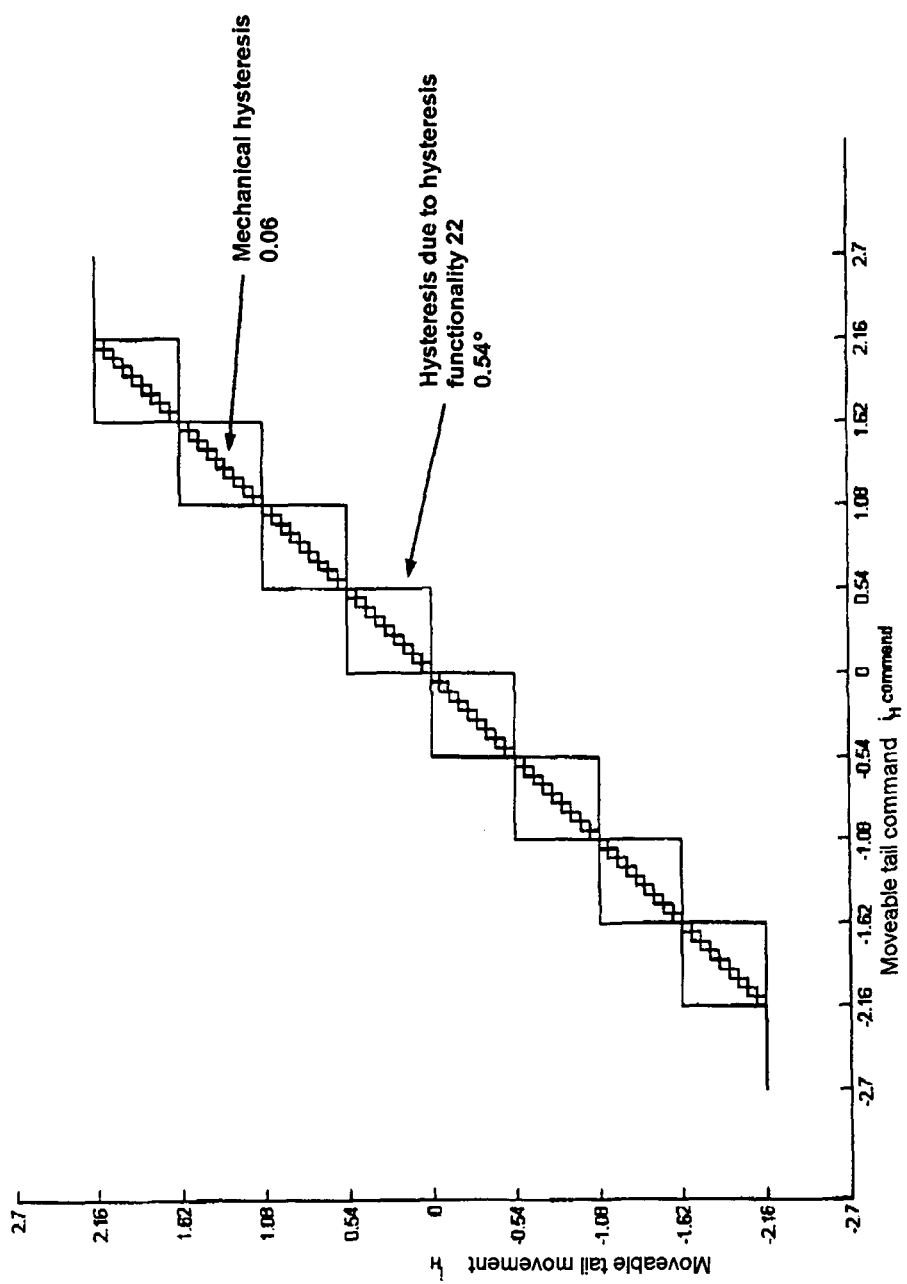
Figure 5:
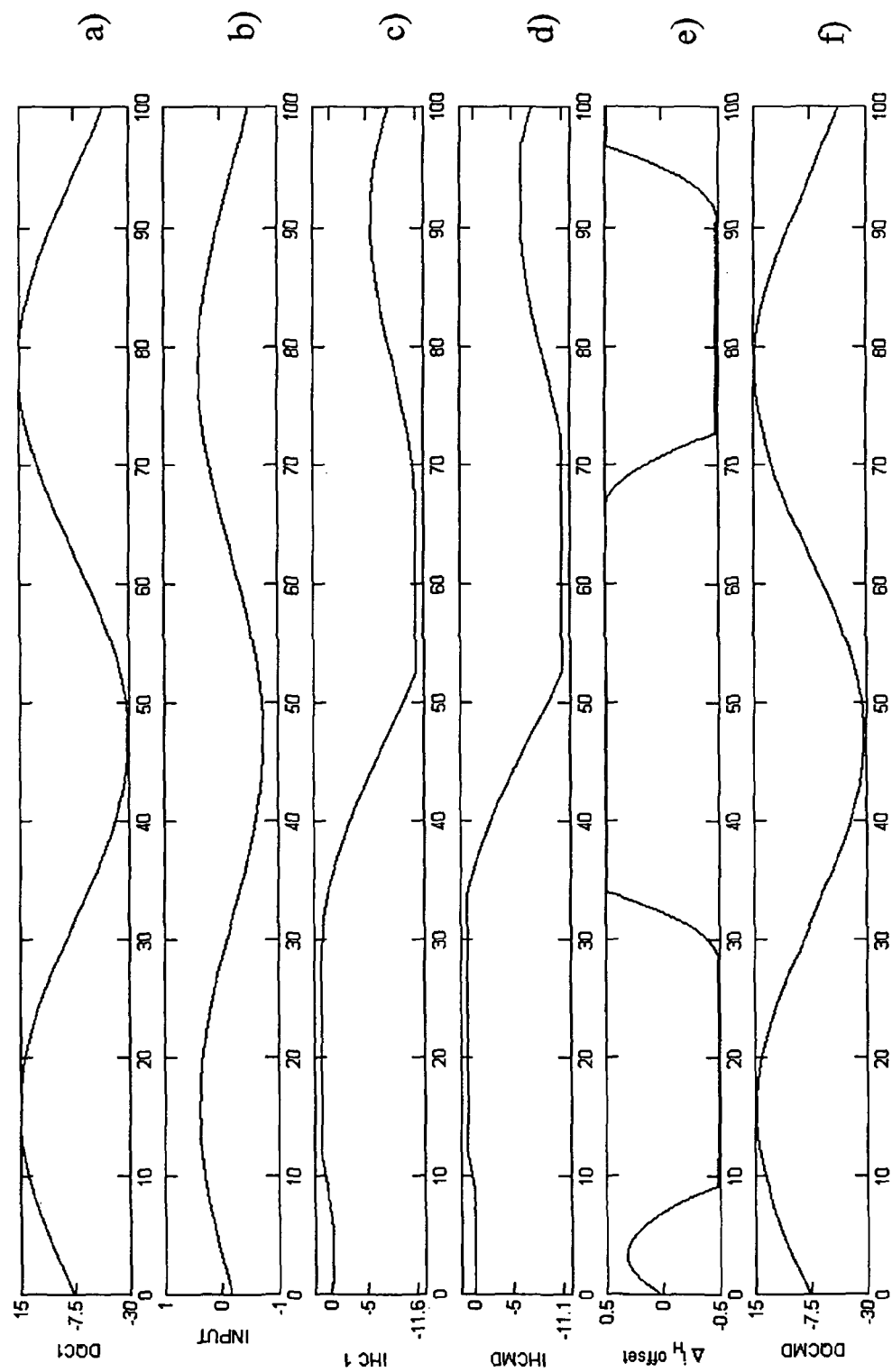

FIG. 4 is a schematic staircase diagram which shows the generation of a step-shaped moveable tail command which serves to actuate the moveable tail, depending on an input moveable tail command according to a special exemplary embodiment of the invention, where a reference curve with a staircase function having smaller steps, generated by mechanical hysteresis in conventional moveable tail trimming is shown to illustrate the mode of action of the invention;

FIG. 5 is a diagram showing a number of signals which appear at different positions in the exemplary embodiment of the device for moveable tail trimming according to the invention shown in FIG. 2;

FIGS. 6 to 8 and 9 to 11 are each three diagrams showing the time behaviour of the positions and forces occurring at the moveable tail during a moveable tail trimming having a hysteresis of 0.54° according to a first exemplary embodiment or having a hysteresis of 0.9° according to a second exemplary embodiment of the invention, in each case in an exemplary fashion for the example of a real flight for takeoff, the entire mission or cruising and landing.

Figure 1:
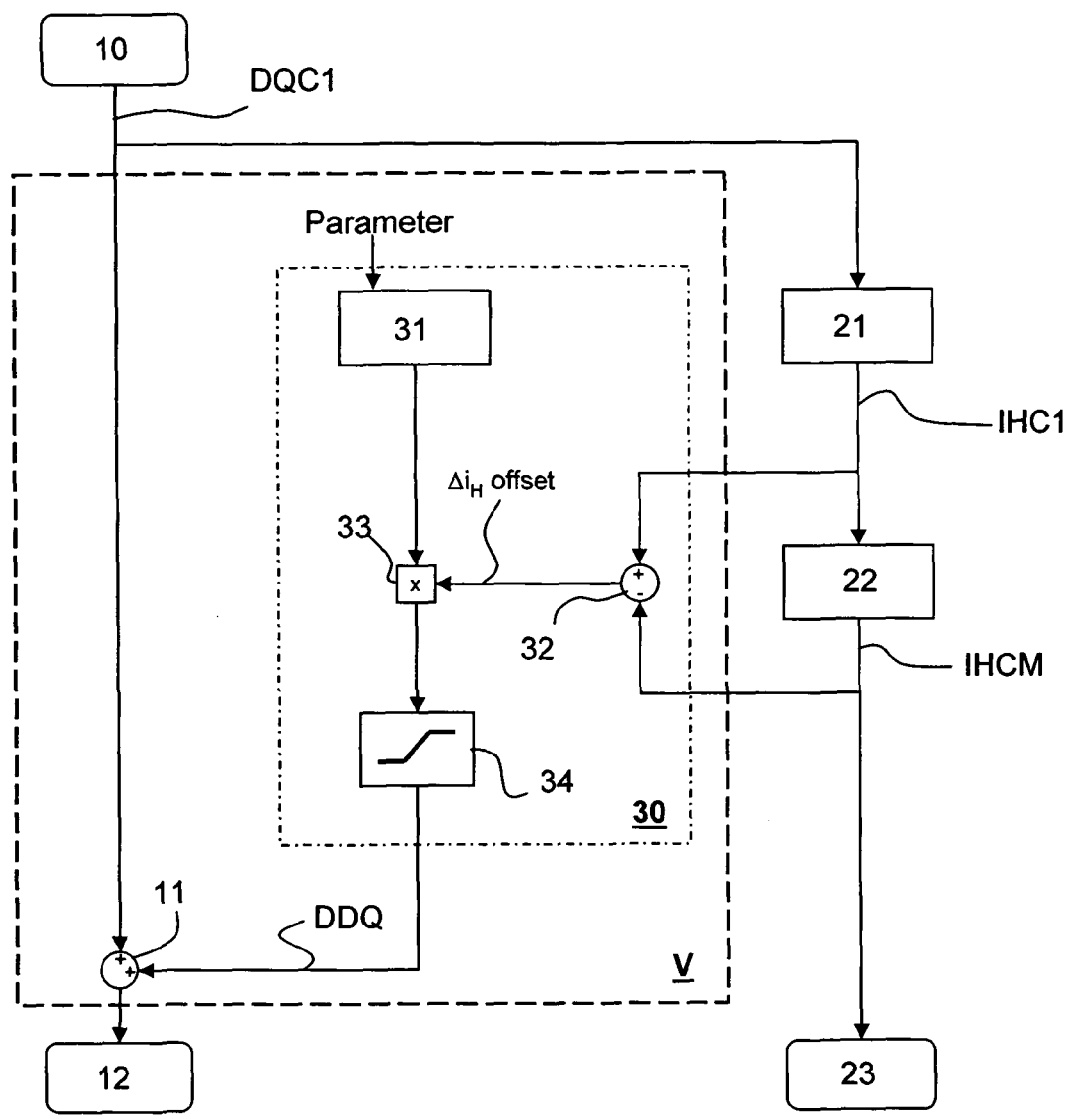

FIG. 1 shows an exemplary embodiment of the method for moveable tail trimming according to the invention in the form of a block diagram. The reference numeral 10 denotes an input for an elevator signal DQC1 supplied externally or by an aircraft system which is supplied for compensating the pitching moment balance of the aircraft by a permanent automatic trimming (auto-trimming) or for changing the vertical path guidance by pilot input or an autopilot. This elevator signal DQC1 is firstly supplied directly to the elevator 12, more precisely its actuating or adjusting device, secondly the elevator signal DQC1 is fed to a module 21 in which a moveable tail command calculation is carried out, The output signal ICH1 generated by the module 21 for the moveable tail command calculation is supplied to a module 22 which generates the moveable tail IHCMD as an output signal, which is supplied to the moveable tail 23, more accurately its adjusting or actuating device.

In this connection, the term moveable tail 23 or horizontal stabilizer is understood as a wing or a main wing of the elevator assembly or a part therefore and the term rudder or elevator 12 is understood as an adjusting flap hinged thereto. In this exemplary embodiment, the moveable tail extends on both sides of the aircraft longitudinal axis. In particular, the parts of the moveable tail extending on the sides of the aircraft longitudinal axis can be rigidly interconnected to one another.

The adjusting drives of the elevator and the moveable tail and/or their actuation can in particular be provided in such a manner that the regulating speed of the elevator 12, typically about 35°/s to 40°/s is substantially higher than the regulating speed of the moveable tail 23 which is, for example 0.5°/s to 2.0°/s so that the movement of the elevator 12 is in advance of the movement of the moveable tail 23. If a perturbation occurs in the pitching moment balance or a change in the vertical trajectory guidance is instructed, the fast-running elevator 12 can initially take over the production of the additional aerodynamic forces required and the slower-running moveable tail 23 runs behind the elevator 12 with its own speed in a uniformly directed movement. In this case, the generation of the aerodynamic additional forces for the flight manoeuvre is increasingly shifted from the elevator 12 to the moveable tail 23, the further the moveable tail 23 follows the elevator 12, and at the same time, as a result of the trimming position of the aircraft changing in the desired sense, the externally supplied elevator signal DQC1 decreases. Once the required overall efficiency of the forces of the elevator 12 and the moveable tail 23 is achieved, the elevator 12 stops and then runs in an oppositely directed movement to the moveable tail running more slowly behind.

The control device according to the invention for actuating an adjusting drive for adjusting the elevator 12 and the adjusting drive for adjusting a moveable tail 23 uses an elevator control variable which is varied in certain control phases so that the elevator control variable used in a first step is designed as a first elevator control variable. The elevator signal DQC1 is supplied to the control device via the elevator signal input 10 of the control device or is generated in the control device itself. If the aircraft in which the device according to the invention is used comprises an aircraft with an autopilot, the elevator signal DQC1 is a command signal generated by the autopilot which is related to command signals for other adjusting flaps and which is generated on the basis of inputs from sensors such as the air data sensors, inertial data sensors or the sensors for determining adjusting states of the flaps. The control device comprises:

a moveable tail command calculation module 21 having a function for calculating a moveable tail command IHC1 for actuating the moveable tail adjusting drive in such a manner that the moveable tail 23 is tracked to the position of the elevator 12;

a moveable tail command output module 22 connected to the moveable tail command calculation module 21 for transmitting calculated moveable tail commands IHC1, which is connected to an adjusting drive for adjusting a moveable tail 23 and which has a function which, depending on the calculated adjusting states of the elevator 12 and/or the moveable tail 23 or flight states, actuates the adjusting drive to adjust a moveable tail 23 for retaining the adjusting state of the moveable tail adjusting drive or for actuating the moveable tail adjusting drive with a moveable tail IHCMD for changing the adjusting state of the moveable tail 23, an elevator pre-command module V connected to the moveable tail command output module 22, having a pre-command variable determination module 30 for generating an elevator pre-command variable and an action module 11 for acting upon the first elevator control variable with the elevator pre-command variable to form an elevator command DQCMD to actuate the elevator adjusting drive.

The moveable tail command output module 22 has a function 32 for forming a deviation between the moveable tail command IHC1 calculated by the moveable tail command calculation module 21 and the moveable tail command IHCMD output for actuating the moveable tail adjusting drive for actuating the moveable tail drive. The pre-command variable determination module 30 is set up in such a manner that this receives the deviation values and determines the elevator pre-command variable DDQ therefrom.

According to the invention, a moveable tail command IHC1 for actuating the moveable tail adjusting drive is calculated on the basis of an elevator command for actuating the elevator adjusting drive in the module 21 in such a manner that the moveable tail 23 is tracked to the position of the elevator 12 and depending on the adjusting states of the elevator 12 and/or of the moveable tail and/or of flight states and/or of values sent by another aircraft system like the flight control system, the adjusting state of the moveable tail adjusting drive or actuation of the moveable tail adjusting drive with a moveable tail command IHCMD for changing the adjusting state of the moveable tail 23 is retained. The adjusting state of the moveable tail 23 can be retained by transmitting a constant command signal from the module 22 to the adjusting drive of the moveable tail 23.

As a result of the absence of a corresponding adjusting movement of the moveable tail 23, according to the invention an action of the elevator command is effected to compensate for the retention of the adjusting state of the moveable tail adjusting drive which is thus provided with an elevator command for changing the adjusting state of the elevator 12 during actuation of the elevator adjusting drive and in the event of a deviation of the calculated moveable tail command IHC1 and commanded moveable tail IHCMD.

The retention of the adjusting state of the moveable tail adjusting drive or actuation of the moveable tail adjusting drive with a moveable tail command depending on adjusting states of the elevator and/or the moveable tail or flight states can be effected in particular on the basis of a pre-determined or determined, i.e. therefore variable, range for the moveable tail command, whose limits are related to the adjusting states of the elevator 12. For example, it can be provided that in various regions of adjusting states of the elevator 12, a command or tracking of the moveable tail 23 is omitted. These regions of adjusting states can be predefined by other aircraft systems, e.g. in critical flight phases or for influencing the flight performance parameters or for reducing the resistance of the aircraft. The phase of non-commanding of the moveable tail 23 by the module 22 can at the same time be provided in particular by other aircraft systems with the onset of said situations by transmitting a corresponding parameter to the module 22.

Alternatively or additionally, it can be provided that the limits of the range for the moveable tail command IHCMD are specified depending on the calculated moveable tail command IHC1.

Alternatively or additionally, it can be provided that the limits of the range for the moveable tail command IHCMD are formed from a first threshold value and a second threshold value,
  wherein in one time interval, an actuation of the moveable tail adjusting drive with an moveable tail command IHCMD for changing the adjusting state of the moveable tail 23 is only made when the absolute magnitude of the difference between the calculated moveable tail command IHC1 and the commanded moveable tail command IHCMD relevant to this time interval or an actual adjusting state of the moveable tail 22 exceeds a first threshold value, and
  wherein the moveable tail adjusting drive is actuated with an moveable tail command IHCMD in such a manner that the adjusting state of the moveable tail 23 does not change if a value derived from the calculated moveable tail command IHC1 and/or the commanded moveable tail command IHCMD relevant to this time interval or an actual adjusting state of the moveable tail 22 is below the second threshold value.

The first threshold value can be a constant value which is predefined or which is predefined or determined as a maximum permissible deviation. The maximum permissible deviation can in particular be determined from a deviation between a commanded or actual, i.e. determined, absolute adjusting state of the elevator 12 and a commanded or actual, i.e. determined, absolute adjusting state of the moveable tails 23. The absolute adjusting state relates in this case to a common reference line for the moveable tail and the elevator, e.g. the aircraft longitudinal axis.

The first threshold value can also be a value derived from flight status variables and/or the adjusting state of the elevator occurring in the time interval and/or the adjusting state of the moveable tail or a time value so that the comparison is provided in such a manner that the threshold value is exceeded when a flight status variable and/or an adjusting state of the elevator occurring in the time interval and/or an adjusting state of the moveable tail or a time value or a function of these values exceeds a desired value.

The adjusting state is understood in this connection as the adjusting position, the regulating speed or regulating acceleration of a combination of these components.

Alternatively or additionally, it can be provided that the moveable tail adjusting drive is actuated with a moveable tail command IHCMD in such a manner that the adjusting state of the moveable tail 23 does not change or no longer changes if the absolute magnitude of the difference between the calculated moveable tail command IHC1 and the commanded moveable tail command IHCMD relevant to this time interval or an actual adjusting state of the moveable tail 23 is below the second threshold value.

In one exemplary embodiment, the value with which the second threshold value is compared is a distance between the adjusting position of the moveable tail 22 and the instantaneous adjusting position of the elevator 12 or a value derived from this distance so that the second threshold value is fallen below when the moveable tail 23 falls below an angular distance to the elevator 12.

The use of an absolute magnitude of the difference from reference values in a comparison with the first and the second threshold value leads to a hysteresis effect for the moveable tail movement depending on the moveable tail command, shown in a simplified manner in FIG. 4.

Alternatively or additionally, the value which is compared with the second threshold value can be the regulating speed of the moveable tail 22 or a value derived from this so that the threshold value is fallen below when the moveable tail 23 falls below a predetermined regulating speed.

In one exemplary embodiment, the output signal IHC1 of the moveable tail command calculation module 21 is supplied to the moveable tail 23 or its adjusting drive via the moveable tail command output module 22 as a result of a threshold value processing carried out therein. In this case, therefore a start condition with a first threshold value is set in the module 22 firstly with the aid of a reference function and when this threshold value is reached or exceeded, the moveable tail command IHC1 calculated in the moveable tail command calculation module 21 is supplied as command signal IHCMD from the module 22 to the moveable tail 23, or its adjusting drive, to adjust the same.

If the calculated moveable tail command IHC1 in the comparison performed in the module 22 does not exceed the first threshold value, the calculated moveable tail command IHC1 is not output to the moveable tail 23. On the other hand, a stop condition is set in the module 22 with the aid of a reference function and a second threshold value and when this threshold value is reached or exceeded, the moveable tail command IHC1 calculated in the module 21 is not supplied as command signal IHCMD 2 to the moveable tail 23 or its adjusting drive to adjust the same.

At the same time, the moveable tail command IHC1 calculated in the module 21 which, if the first threshold value is not exceeded and is not commanded to the moveable tail 23, is taken into account during actuation of the elevator 12 by a suitably dimensioned pre-command. In this case, the action of the elevator command to compensate for the retention of the adjusting state of the moveable tail adjusting drive with the deviation, this deviation is multiplied by a factor which is determined from the control surface efficiencies of elevator 12 and moveable tail 22. In particular, the ratio of the adjusting surface efficiencies of elevator 12 and moveable tail 22 is determined when taking into account the control surface efficiencies [so] that the control surface efficiencies can be set as constant values. In this case, it can further be provided that at least one of the control surface efficiencies is calculated taking into account one or more of the following parameters: flight speed, adjusting state of the moveable tail 23 and/or adjusting state of the elevator 22, position of a flow flap of the aircraft high lift system and/or pitching position of the aircraft.

In a further exemplary embodiment, the difference DeltaH offset can be formed in a module 32 from the moveable tail command IHC1 calculated in the module 22 and the moveable tail command IHCMD output by the step function/hysteresis module 22 actually to the moveable tail 23. This corresponds to an elevator deflection which does not correspond in its action to the action of the non-commanded moveable tail deflection so that the non-commanding of the moveable tail 23 or a corresponding adjusting drive is compensated by the pre-command device. The pre-command generated by the pre-command device is added to the elevator signal 10 in a module 11 and the output of the summation member 11 is coupled functionally to the elevator 12 or an adjusting drive assigned thereto for adjusting the same in such a manner that the sum signal can be supplied directly to the elevator 12 in order to command or adjust this.

The output of the module 21 is functionally connected firstly to the module 22 and the difference module 32. The module 22 is functionally connected to the moveable tail, i.e. an adjusting drive for adjusting the moveable tail 23 so that the output signal IHCMD of the module 22 is transmitted to the module 23, i.e., to the adjusting drive of the moveable tail 23.

However, if the moveable tail command IHC1 calculated in the module 21 exceeds the predefined first threshold value, so that after the comparison in the module 22, the final moveable tail command IHCMD is output to the moveable tail 23, this is taken into account whereby in a difference module 32, the difference DiH offset ($\Delta i_H$offset) between the moveable tail command IHC1 calculated in 21 and the moveable tail command IHCMD actually output by the step function/hysteresis 22 to the moveable tail 23 decreases. That is, the pre-command supplied to the elevator 12 is reduced in the manner in which the moveable tail 23 is actually actuated or operated.

The actuating method according to the invention comprises a pre-command function branch V which is formed from the pre-command variable determination module 30 and the addition unit 11. The pre-command variable determination module 30 can be formed in particular from the module 31 which generates a quantity representing the ratio of the adjusting surface efficiencies of moveable tail 23 and elevator 22, the difference module 32, the multiplier module 33 and optionally a limiter module 34. The pre-command variable determination module 30 determines a pre-command signal DDQ which is supplied to an addition unit 11. With the addition unit 11 the pre-command signal DDQ is added to the elevator signal DQC1 and the sum of this addition is supplied as the signal DQCMD to the elevator 12 or an adjusting drive of the elevator 12.

In the multiplication module 33, the difference DiH offset output by the difference module 32 is multiplied or weighted with a quantity determined in the module 31 which represents the ratio of the adjusting surface efficiencies of moveable tail and elevator. The different aerodynamic efficiencies of the two adjusting surfaces are hereby taken into account so that the deviation of the moveable tail command IHCMD actually output to the moveable tail 23 from the moveable tail command IHC1 calculated in the module 21, effected as a result of the step function or hysteresis implemented in the module 22, is converted into an adequate variation in the position of the elevator 12. Since the efficiencies of the two adjusting surfaces 12, 23 along the adjusting region vary, those parameters which substantially influence said ratio can be taken into account in the calculation of the ratio of the adjusting surface efficiencies in the module 31. These are in particular the speed (Mach number) of the aircraft, the absolute moveable tail position itself, the flap position of the high lift system and the pitch position of the aircraft. The signal weighted with the adjusting surface efficiency ratio in the module 33 is normalised and limited in the module 34 and is supplied as signal DDQ to an addition unit 11 which additively combines the weighted signal with the elevator signal 10.

FIG. 4 shows in a diagram the command iH (ordinate "$i_H$") actually output by the step function and hysteresis module 22 to the moveable tail 23 as a function of the moveable tail command iH command (abscissa "$i_H$command") calculated by the module 21 in the form of a step function with the large steps for a special case in which the first threshold value is a constant distance from the adjusting position of the moveable tail 23 and the second threshold value seen in absolute terms is a constant angular distance between the moveable tail 23 and the elevator 12 and the corresponding values are compared with these threshold values. The angular distance between elevator and moveable tail is understood to be the absolute adjusting angle of elevator and moveable tail so that the angular distance is zero when the angular position [ . . . ] a reference plane of the moveable tail 23 and the elevator 12 viewed in their cross-section have the same alignment. Compared to this, the movement of the moveable tail 23 in response to the moveable tail command 21 is shown as a step function with small steps, as is obtained when the command is fed directly to the moveable tail as a result of mechanical hysteresis.

According to the exemplary embodiment described here, the moveable tail command IHC1 calculated in the module 21, starting from an initial value which corresponds to the instantaneous moveable tail position or an instantaneous adjusting state, is compared with the respectively predefined threshold value. If the respective threshold value is exceeded, the comparison of the moveable tail command and threshold value is de-activated and the moveable tail 23 adjusts in response to the moveable tail command IHCMD output by the module 22 in the direction of an end position which corresponds to the calculated moveable tail command i.e. in this phase the moveable tail 23 is commanded with the moveable tail command IHCMD for it adjustment.

The comparison of the moveable tail command and threshold value is re-activated starting from an initial value then corresponding to the respectively instantaneous moveable tail position or a respectively instantaneous adjusting state if this instantaneous actual moveable tail positions is close to the calculated end position IHC1 at least apart from a predefined dimension. This can take place, for example, depending on whether the adjusting rate of the moveable tail 23 has dropped below a predefined fraction, for example, 20% of the maximum adjusting rate. Since the running speed of the moveable tail 23 decreases as the instantaneous moveable tail position approaches the calculated end position, the relationship of the actual to the maximum running speed can be used as an indicator for the approach to the postulated end position from which the threshold value function of the hysteresis is activated again.

As shown in FIG. 4, in 22 the step and hysteresis function has the effect that the moveable tail position is intentionally commanded in larger steps, for example 0.5° to 1.0°, than the nowadays usual adjusting accuracy of, for example, about 0.06° to about 0.18°. Consequently the moveable tail 23 does not run immediately behind the elevator 12 but only after reaching the respectively predefined threshold value.

For illustration FIG. 4 shows a highly specialised application in which the elevator 12 is moved in constant steps of 0.54. degrees and the moveable tail is tracked on the basis of a first and second threshold value until elevator and moveable tail have the same alignment, i.e. are brought onto a common chord. In the exemplary embodiment in which the variation of the angle of adjustment of the elevator 12 depends on the flight status, the moveable tail 23 will not always be moved to the same adjusting position or the same angle of adjustment during an adjustment of the elevator on the basis of the first and second threshold value. Furthermore, as a result of the first threshold value which makes it necessary to exceed the same for the movement of the moveable tail 23, the elevator and moveable tail are not aligned permanently on a common chord but only when the first threshold value is exceeded and the elevator position rather exhibits small deviations from the common chord. The elevator 12 therefore takes over the generation of the pitching moment correction in the adjusting range in which the moveable tail 23 is held fixed by the step and hysteresis function. The adjusting activity, i.e. the frequency of the movement, of the moveable tail 23 diminishes significantly whilst that of the elevator 12 remains approximately the same. As a result of the reduced adjusting activity, the wear of all the components involved in the moveable tail movement is reduced and in particular the locally highly stressed region of a trimming spindle contained in the adjusting or actuating device of the moveable tail 23 is subjected to less wear.

In a conventional hysteresis (staircase-shaped transmission function with linearly increasing input signal), the adjusting screw on the trimming spindle would always come to rest at the same positions, i.e. the positions corresponding to the threshold values of the hysteresis. At these positions increased wear would presumably occur. In order to avoid this, it is therefore provided according to the exemplary embodiment described here that after exceeding the initial threshold value, the moveable tail 23 is allowed to run until the calculated end position is reached. The calculated end position is independent of the threshold value of the hysteresis. The moveable tail 23 can therefore come to rest between two threshold values. As has already been explained previously, the hysteresis is only activated again when an approach between the command quantity IHCMD and the actual position of the moveable tail 23 is achieved and in particular, the actual running speed of the moveable tail lies below a specific limiting value, for example, 20% of the maximum adjusting rate of the moveable tail. Despite hysteresis, the moveable tail can therefore stop at arbitrary positions. Re-starting of the moveable tail takes place in relation to the last stop position and taking into account the threshold value of the hysteresis. In this way, there is no fixed division in the transmission function of the hysteresis and therefore also no typical fixed staircase function of a hysteresis. The staircase function shown in FIG. 4 is only to be understood schematically insofar as the origin of the steps shown is not fixed along the central line but is in each case related to the respectively last end position.

FIG. 2 shows a simplified circuit diagram of a device for moveable tail trimming according to the embodiment of the method according to the invention shown by reference to FIG. 1. The components and signals shown in FIG. 2 are provided with the same reference numerals as the process steps shown in FIG. 1 insofar as they perform the same or similar functions.

The device comprises a device for calculation of moveable tail commands designated overall with the reference numeral 21, which has an input 10 for supplying an elevator signal DQC1. This elevator signal DQC1 can be supplied via a line 101 and an adder 11 directly to the elevator 12. In the exemplary embodiment shown, the device 21 for calculation of moveable tail commands is formed by an input amplifier 211 which serves to normalise the signal, a limiter circuit 212 and an integrator 213. In the integrator 213, summation of the elevator signal DQC1 present at the input 10 is performed so that a continuous moveable tail command IHC1 of continuously increasing amplitude appears at the output of the device 21.

The moveable tail command IHC1 delivered by the device 21 is fed on the one hand to a hysteresis circuit 22 and on the other hand to a subtractor 32 which is connected at its second input to the output of the hysteresis circuit 22 for receiving the output signal IHCMD therefrom. The output signal IHCMD is furthermore output via a line 221 as a step-shaped moveable tail command to the moveable tail 23 or more precisely to its adjusting or actuating device.

Furthermore provided is a device 31 for calculating the ratio of the adjusting surface efficiencies, from which the output signal is fed to a multiplier 33 whose other input is connected to the output of the subtractor 32 for receiving its output signal. The output signal of the subtractor 32 is the signal DiH offset, which has already been explained in detail with reference to FIG. 1, and which represents the positioning error of the moveable tail 23 resulting from the deviation of the step-shaped moveable tail command IHCMD actually delivered by the hysteresis circuit 22 to the moveable tail 23 from the calculated continuous moveable tail IHC1. This positioning error of the moveable tail DiH offset is thus weighted with the signal from the device 31 for calculating the ratio of the adjusting surface efficiencies and with large threshold values is limited in a downstream limiter 34. The signal DDQ thus obtained is then fed to the adder 11 where it is combined additively with the elevator signal DQC1 supplied directly via the line 101. The result is a combined elevator command DQCMD which is output to the elevator 12. This combined elevator command thus takes into account the directly input elevator signal DQC1 from the input 10 and also an elevator pre-command component which takes into account the positioning error DiH offset of the moveable tail 23.

Figure 3:
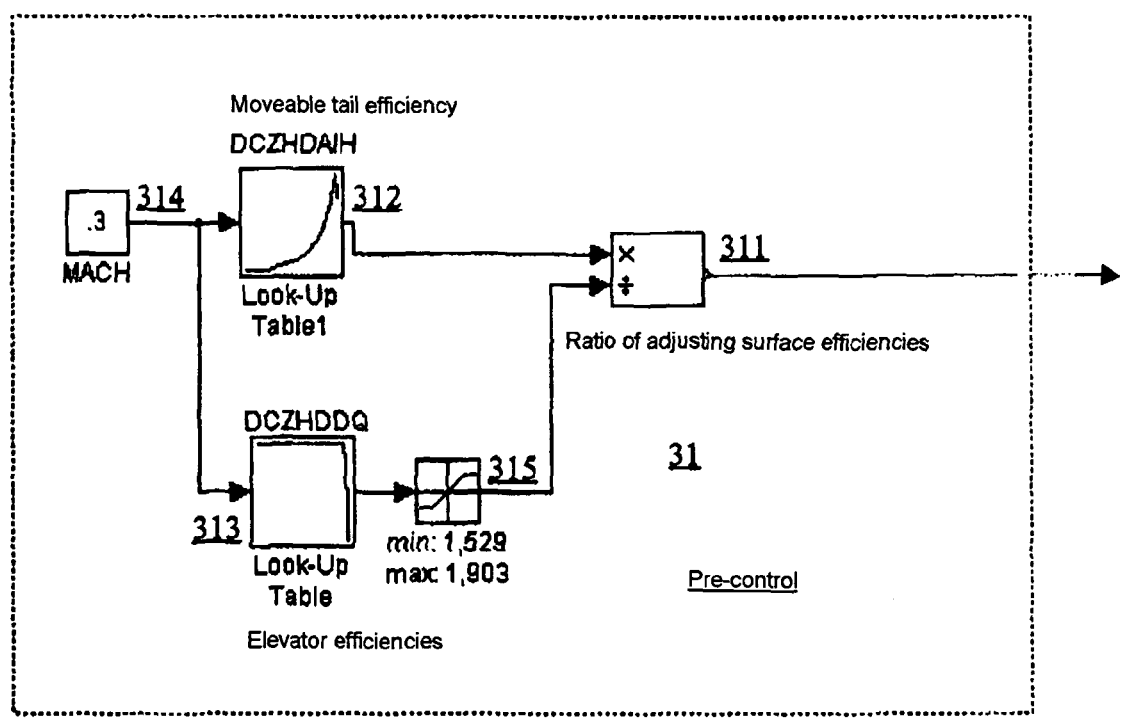
FIG. 3 is an enlarged view of a component of the device shown in FIG. 2 which is provided to calculate the ratio of adjusting surface efficiencies of moveable tail and elevator according to one exemplary embodiment of the invention.

FIG. 3 shows an exemplary embodiment of the device 31 for calculating the ratio of the adjusting surface efficiencies in detail. This device 31 substantially comprises two tables (look-up tables) 312 and 313 which represent the adjusting surface efficiencies of moveable tail 23 or elevator 12 as a function of the flight status parameters.

The table 312 represents the moveable tail efficiency, the table 313 represents the elevator efficiency. The output signals of the tables 312, 313 are fed to the inputs of a division circuit 311, that of the latter via a limiter circuit 315 which takes account of a limitation of the elevator efficiency.

The time profiles of the signals DQC1, INPU, IHC1, IHCMD, DiH offset and DQCMD which occur in the circuit shown in FIG. 2 and which have already been described previously are shown as an example in the time profile in FIG. 5. The input signal DQC1 is here a sinusoidal oscillation signal s(t=22.5. sin(0.1. t)−7.5, FIG. 5a) generated by a test signal generator. This represents, for example, the output signal of a permanently automatically operating trimming device which should compensate for the pitching moment balance of an aircraft.

The signal INPUT, FIG. 5b) shows the signal DQC1 after normalising by the amplifier 211. The signal IHC1, FIG. 5c) obtained after calculating the moveable tail command is obtained as the output signal of the integrator circuit 213 and in the exemplary embodiment shown here, is limited to the range of −11.6. to +1.2. FIG. 5d) shows the output signal IHCMD of the hysteresis circuit 22. This differs from the signal IHC1 insofar as it suppresses the latter if it lies below the threshold value of the hysteresis circuit 22. The positioning error DiH offset resulting therefore which appears at the subtractor 32 is shown in FIG. 5e). Finally, the signal DQCMD shown in FIG. 5f) is the combined elevator command which is output by the adder 11 to the elevator 12.

Figure 6:
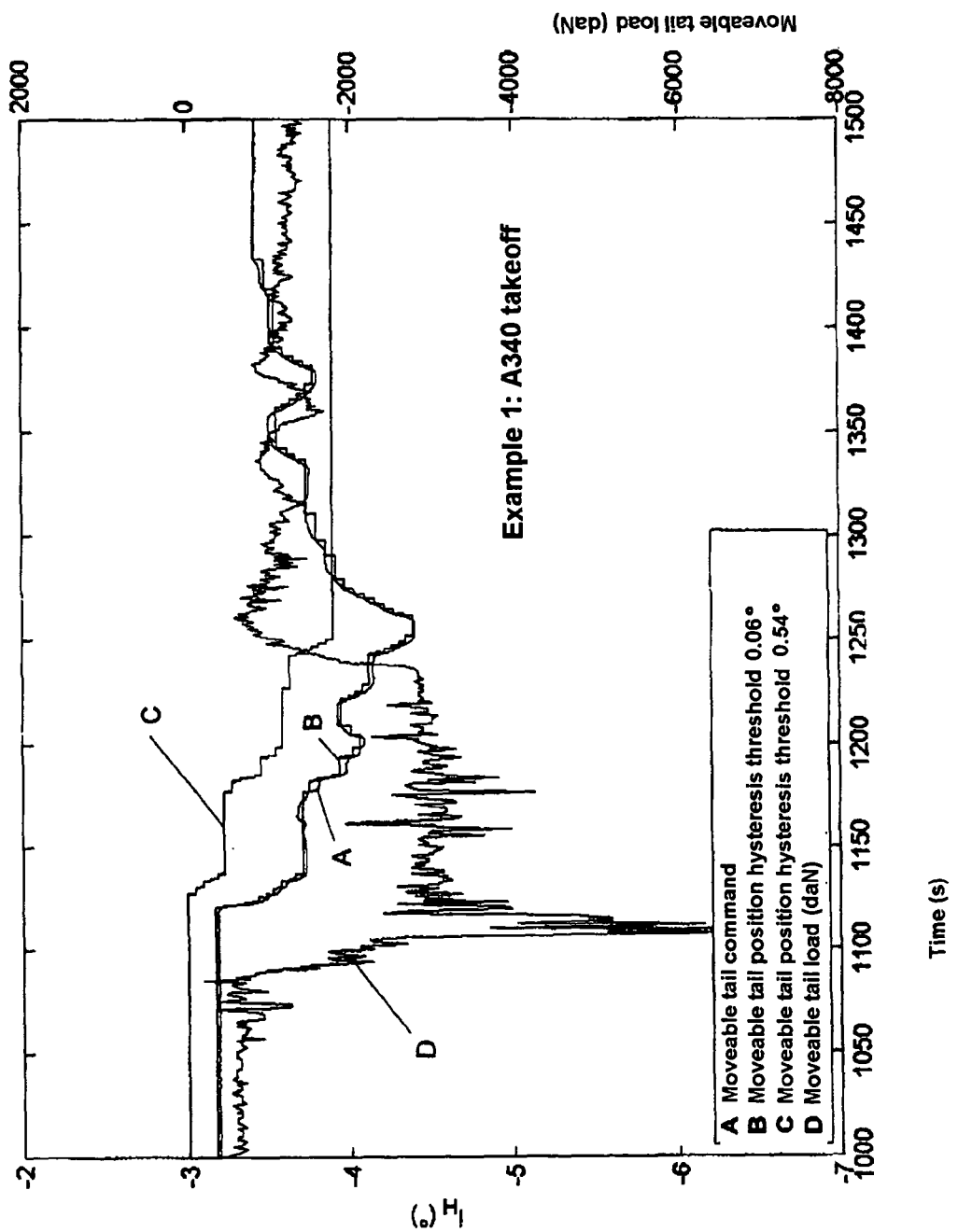
Figure 7:
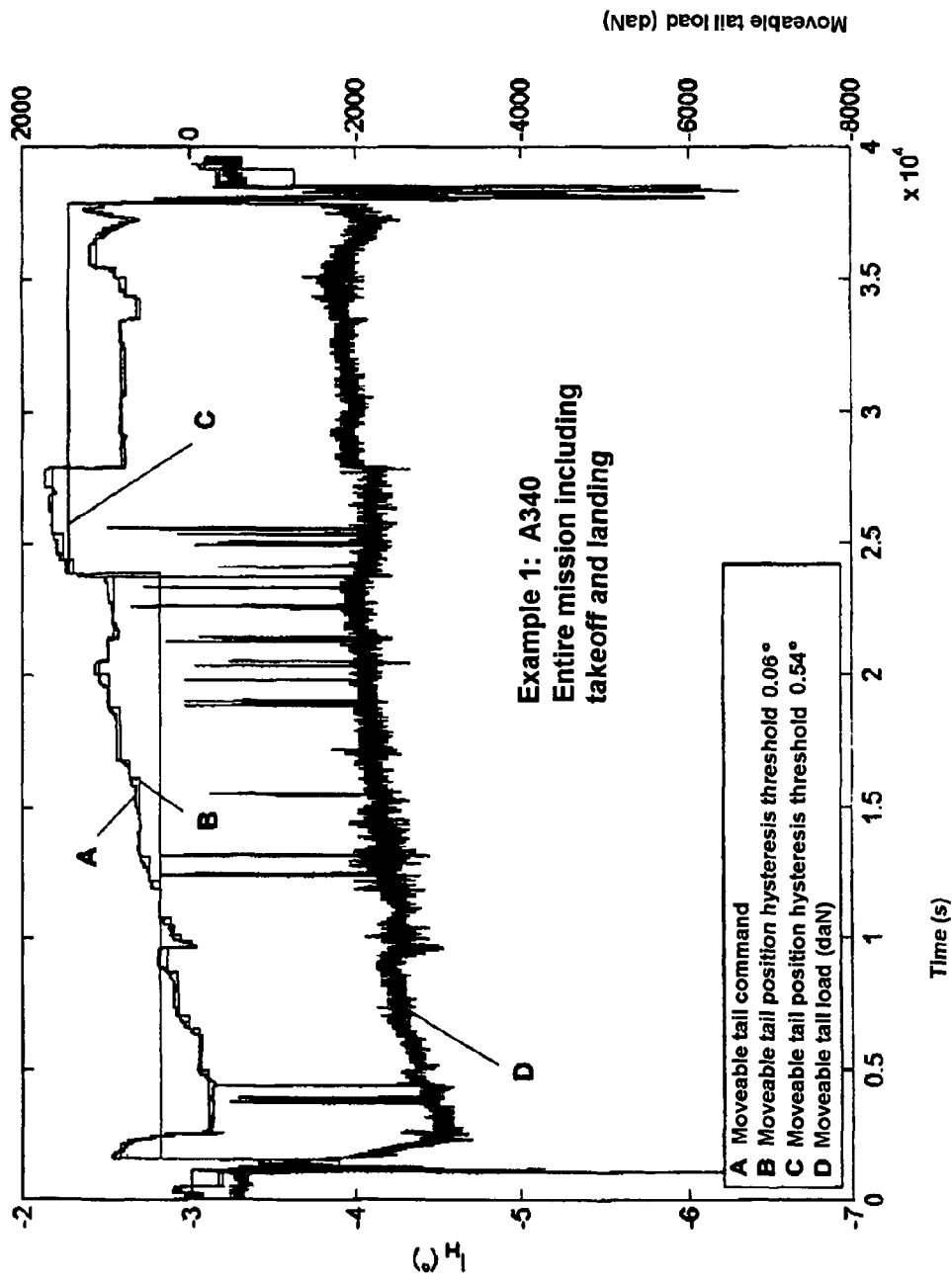
Figure 8:
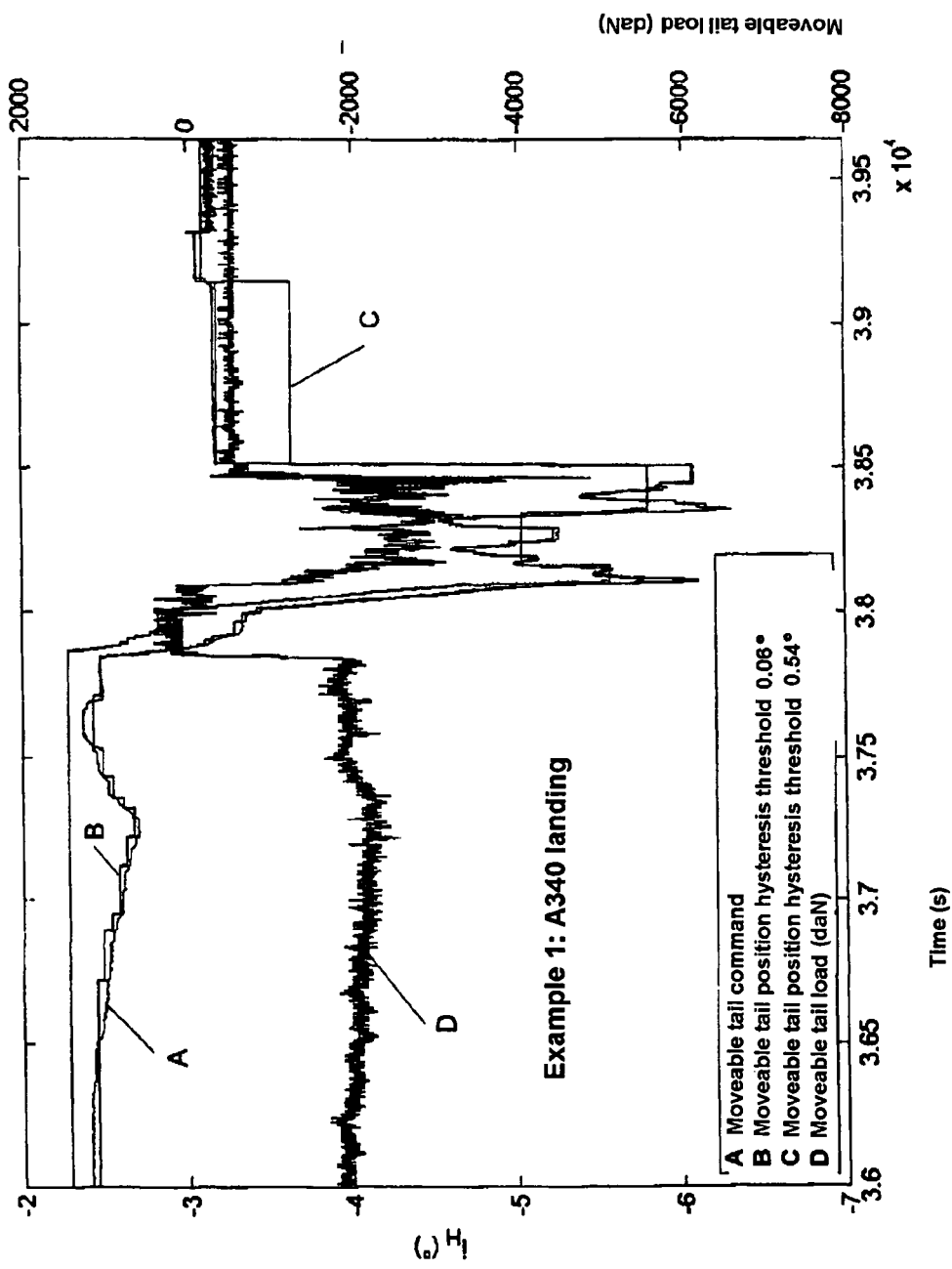
Figure 9:
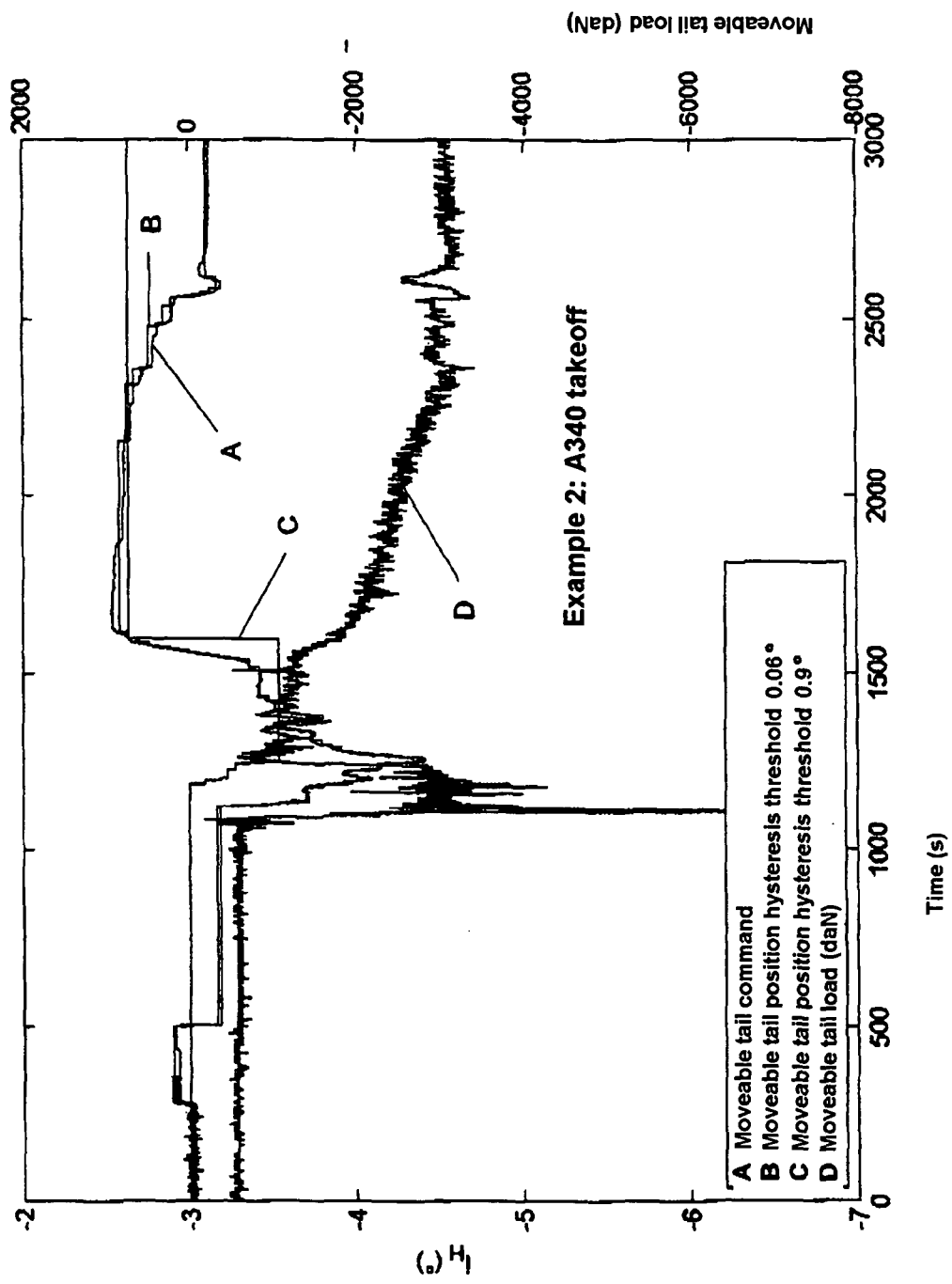
Figure 10:
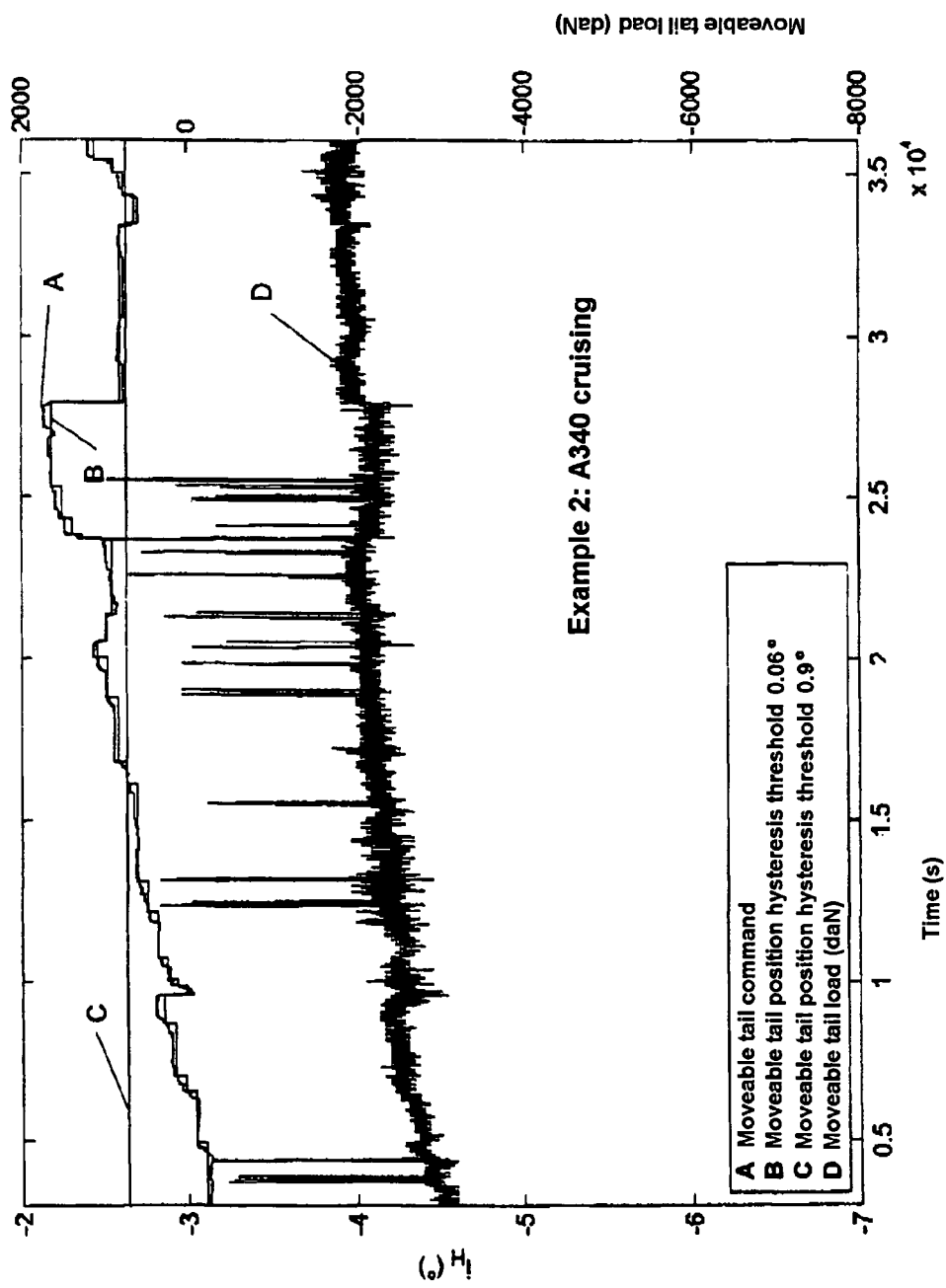
Figure 11:
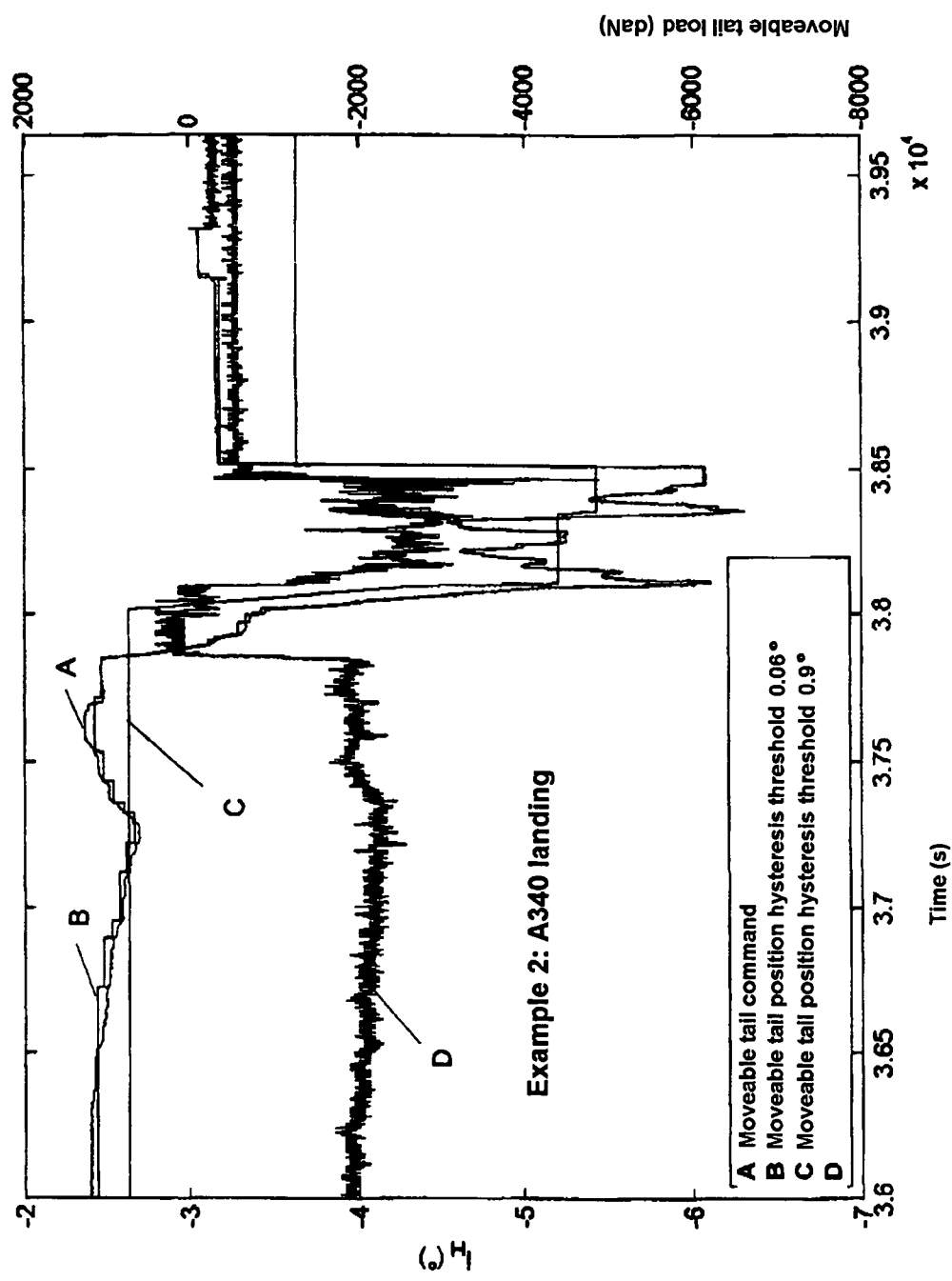

FIGS. 6 to 11 show diagrams in which the moveable tail commands and the moveable tail force as shown as a function of time for two exemplary flights with the A340. aircraft type in the phases takeoff, entire mission or cruise and landing. Of the two closely adjacent curves A and B, the smooth curve A indicates the calculated continuous moveable tail command IHC1 whereas the step function B closely following this represents the resulting moveable tail position with a slight hysteresis of 0.06° such as is obtained as a result of the mechanical hysteresis in the mechanical drive of the moveable tail 23 during conventional moveable tail trimming. The curve C, on the other hand, in each shows the position of the moveable tail 23 during trimming according to the present invention where FIGS. 6 to 8 show curves C obtained using hysteresis with steps of 0.54° whilst FIGS. 9 to 11 show curves C obtained using hysteresis with steps of 0.9°. In the curves C the mechanical hysteresis of 0.06° reflected in the small steps is superimposed on the intentionally selected hysteresis of 0.54° or 0.9°.

It can be seen from a comparison of curves B and C that when using a step function or hysteresis as effected by the functionality 22 in FIG. 1 or 2, the sum of all the incremental movement steps of the moveable tail movement is significantly smaller (curve C) than without such intentional hysteresis or with the mechanical hysteresis alone in the moveable tail drive (curve B). This particularly has an effect during cruising, cf. FIG. 7 for a hysteresis threshold of 0.54° or FIG. 10 for a hysteresis threshold of 0.9°. However, during takeoff and landing the sum of the incremental movement steps with an intentional hysteresis according to curve C is also significantly smaller than without such hysteresis, cf. curve B.

The elevator and the moveable tail can be adjusted in response to the elevator signal 10 so that their mutual position effects an arching of the overall profile produced by moveable tail and elevator which already as such causes an uplift/down force in the sense of the supplied elevator signal 10. An arching of the overall profile occurs as a result of the previously described slight deviation of the elevator position from the common chord with the moveable tail caused as a result of the hysteresis function. With the same aerodynamic force, typically down force, i.e. downwardly directed uplift on the moveable tail, the air resistance of the arched moveable tail can be lower compared with a straight but more strongly adjusted moveable tail. When designing the moveable tail actuation, it should therefore be noted that an arching on the right side of the overall profile of moveable tail and elevator is formed in the sense of minimising resistance and not a mistrim, i.e. an oppositely directed resistance-increasing adjustment of both adjusting surfaces with a curvature which is oppositely directed to the intended aerodynamic force. Depending on the moveable tail position or flight status, the elevator must therefore stand on the right side of the moveable tail chord to effect the said reduction in resistance. The magnitude of the hysteresis is therefore a measure for the maximum possible camber and the possible reduction in resistance. A corresponding logic function would need to be integrated in the hysteresis functionality 22 or can be achieved by an offset in the moveable tail signal DDQ.

The present invention provides an additional functionality in the actuation of the moveable tail and elevator of an aircraft which is advantageously manifest by a reduction in wear, a lengthening of maintenance intervals and increase in the lifetime of the moveable tail actuation and the corresponding moving parts, for example, recirculating ball mechanism and trimming spindle in the moveable tail drive.

The functionality, that is the components shown in FIGS. 2 and 3 can be implemented in particular by software.

The functional proof and the expected improvements have been demonstrated in an exemplary manner by reference to recorded flight test data as reproduced in FIGS. 6 to 11. The tests were each carried out for a short-distance and a long-distance flight with different threshold values for the hysteresis.

Reference List

10 Elevator signal input
11 Adder
12 Elevator or horizontal stabilizer
21 Moveable tail command calculation
22 Step function/hysteresis
23 Moveable tail
30 pre-command variable determination module
31 Calculation of adjusting surface efficiency ratio
32 Subtractor
34 Multiplier
211 Signal limitation
212 Normalising amplifier
212 Limiter
213 Integrator
311 Divider
312 Table (look-up table)
313 Table (look-up table)
315 Limiter

The invention claimed is:
1. A method for actuating an elevator adjusting drive for adjusting an elevator and a moveable tail adjusting drive for adjusting a moveable tail comprising steps of:
  generating an elevator command to actuate the elevator adjusting drive;
  calculating a calculated moveable tail command for actuating the moveable tail adjusting drive in such a manner that the moveable tail is tracked to a calculated elevator signal input;

depending on the adjusting states of the elevator and/or the moveable tail or flight states, with a commanded moveable tail command
retaining the adjusting state of the moveable tail adjusting drive or
actuating the moveable tail adjusting drive such that the adjusting state of the moveable tail is changed,
during actuation of the elevator adjusting drive with the elevator command for changing the adjusting state of the elevator and in the event of a deviation of the calculated moveable tail command from the commanded moveable tail command, achieving neutral aerodynamic effectiveness by acting upon the elevator command to compensate
for the retention of the adjusting state of the moveable tail adjusting drive or
for the actuation of the moveable tail adjusting drive.

2. The method according to claim 1, wherein the retention of the adjusting state of the moveable tail adjusting drive or the actuation of the moveable tail adjusting drive with the commanded moveable tail command is made depending on the adjusting states of the elevator on the basis of a range for the commanded moveable tail command, the limits whereof are related to adjusting states of the elevator.

3. The method according to claim 2, wherein the limits of the range for the commanded moveable tail command are made depending on the calculated moveable tail command.

4. The method according to claim 2, wherein the limits of the range for the commanded moveable tail command are formed from a first threshold value and a second threshold value,
wherein in one time interval, an actuation of the moveable tail-adjusting drive with the commanded moveable tail command for changing the adjusting state of the moveable tail is only made when the absolute magnitude of the difference between the calculated moveable tail command and the commanded moveable tail command relevant to this time interval or an actual adjusting state of the moveable tail exceeds the first threshold value, and
wherein the moveable tail adjusting drive is actuated with a moveable tail command in such a manner that the adjusting state of the moveable tail does not change if a value derived from the calculated moveable tail command and/or the commanded moveable tail command relevant to this time interval or the actual adjusting state of the moveable tail is below the second threshold value.

5. The method according to claim 4, wherein the first and/or second threshold value is a constant value which corresponds to a difference angle.

6. The method according to claim 4, wherein the first and/or second threshold value is a value derived from a selected flight parameter and/or the adjusting state of the elevator occurring in the time interval and/or the adjusting state of the moveable tail.

7. The method according to claim 4, wherein the moveable tail-adjusting drive is actuated with the moveable tail command in such a manner that the adjusting state of the moveable tail does not change if the absolute magnitude of the difference between the calculated moveable tail command and the commanded moveable tail command relevant to this time interval or the actual adjusting state of the moveable tail is below the second threshold value.

8. The method according to claim 4, wherein the value compared with the second threshold value is a distance between an calculated adjusting position of the moveable tail and an instantaneous adjusting position of the moveable tail or a value derived from this distance so that the second threshold value is fallen below when the calculated moveable tail position falls below an angular distance to the commanded moveable tail position.

9. The method according to claim 4, wherein the value compared with the second threshold value is a regulating speed of the moveable tail and/or the elevator or a value derived from the regulating speed so that the second threshold value is fallen below when the moveable tail falls below a predetermined regulating speed.

10. The method according to claim 1, wherein acting upon the elevator command to compensate for a deviation of the calculated moveable tail command from the commanded moveable tail command comprises multiplying the elevator command by a factor which is determined from the control surface efficiencies of the elevator and the moveable tail.

11. The method according to claim 10, further comprising determining a ratio of adjusting surface efficiencies of the elevator and the moveable tail when taking into account the control surface efficiencies.

12. The method according to claim 11, wherein the control surface efficiencies are set as constant values.

13. The method according to claim 11, wherein at least one of the control surface efficiencies is calculated taking into account one or more of the following parameters: flight speed, Mach number, adjusting state of the moveable tail and/or adjusting state of the elevator, aerodynamic angle of attack of the tail, position of a slat and flap of the aircraft high lift system and/or pitching position of the aircraft.

14. A control device for actuating an elevator adjusting drive for adjusting an elevator and a moveable tail adjusting drive for adjusting a moveable tail based on a first elevator control variable, comprising:
a device for calculation of calculated moveable tail commands having a function for calculating a calculated moveable tail command for actuating the moveable tail adjusting drive in such a manner that the moveable tail is tracked to an elevator input signal;
a hysteresis circuit connected to the device for calculation of calculated moveable tail commands, connected to the moveable tail adjusting drive, and having a function which, depending on calculated adjusting states of the elevator and/or the moveable tail or flight states, actuates the moveable tail adjusting drive with a commanded moveable tail command
to adjust the moveable tail for retaining the adjusting state of the moveable tail adjusting drive or
to actuate the moveable tail adjusting drive for changing the adjusting state of the moveable tail,
a device for generating elevator pre-commands connected to the hysteresis circuit, having a device for determining pre-command variables for generating an elevator pre-command variable and having an adder for acting upon the first elevator control variable with the elevator pre-command variable to form an elevator command to actuate the elevator adjusting drive,
wherein the hysteresis circuit has a function for forming a deviation between the calculated moveable tail command and the commanded moveable tail command, and
wherein the device for determining pre-command variables is set up to receive deviation values and to determine the elevator pre-command variable from the function for forming a deviation.

15. The control device according to claim 14, wherein the retention of the adjusting state of the moveable tail adjusting drive or the actuation of the moveable tail adjusting drive with the calculated moveable tail command is made depending on the adjusting states of the elevator on the basis of a range for the moveable tail command, the limits whereof are related to adjusting states of the elevator or are made depending on the calculated moveable tail command.

16. The control device according to claim 15, wherein in the hysteresis circuit the limits of the range for the movable tail command are formed from a first threshold value and a second threshold value,
  wherein in one time interval, an actuation of the moveable tail adjusting drive with an moveable tail command for changing the adjusting state of the moveable tail is only made when the absolute magnitude of the difference between the calculated moveable tail command and the commanded moveable tail command) relevant to this time interval or an actual adjusting state of the moveable tail exceeds the first threshold value, and
  wherein the moveable tail adjusting drive is actuated with the moveable tail command in such a manner that the adjusting state of the moveable tail does not change if a value derived from the calculated moveable tail command and/or the commanded moveable tail command relevant to this time interval or the actual adjusting state of the moveable tail is below the second threshold value.

17. The control device according to claim 16, wherein the first and/or second threshold value is a constant value which corresponds to a difference angle or the first and/or second threshold value is a value derived from a selected flight parameter and/or the adjusting state of the elevator occurring in the time interval and/or the adjusting state of the moveable tail.

18. The control device according to claim 16, wherein the moveable tail adjusting drive is actuated with the calculated moveable tail command in such a manner that the adjusting state of the moveable tail does not change if the absolute magnitude of the difference between the calculated moveable tail command and the commanded moveable tail command relevant to this time interval or an actual adjusting state of the moveable tail is below the second threshold value.

19. The control device according to claim 16, wherein the value compared with the second threshold value is a distance between the calculated adjusting position of the moveable tail and the instantaneous adjusting position of the moveable tail or a value derived from this distance so that the second threshold value is fallen below when the calculated moveable tail position falls below an angular distance to the commanded moveable tail position.

20. The control device according to claim 16, wherein the value compared with the second threshold value is a regulating speed of the moveable tail and/or the elevator or a value derived from the regulating speed of the moveable tail and/or the elevator so that the threshold value is fallen below when the moveable tail falls below a predetermined regulating speed.

21. The control device according to claim 14, wherein determining the elevator pre-command variable from the function for forming a deviation between the calculated moveable tail command and the commanded moveable tail command comprises multiplying the deviation by a factor which is determined from the control surface efficiencies of the elevator and the moveable tail.

22. The control device according to claim 21, wherein a ratio of the adjusting surface efficiencies of the elevator and the moveable tail is determined when taking into account the control surface efficiencies.

23. The control device according to claim 22, wherein the control surface efficiencies are set as constant values.

24. The control device according to claim 23, wherein at least one of the control surface efficiencies is calculated taking into account one or more of the following parameters: flight speed, Mach number, adjusting state of the moveable tail and/or adjusting state of the elevator, aerodynamic angle of attack of the tail, position of a slat and flap of the aircraft high lift system and/or pitching position of the aircraft.

* * * * *

UNITED STATES PATENT AND TRADEMARK OFFICE
CERTIFICATE OF CORRECTION

PATENT NO. : 8,489,257 B2
APPLICATION NO. : 12/450089
DATED : July 16, 2013
INVENTOR(S) : Holzhausen Page 1 of 1

It is certified that error appears in the above-identified patent and that said Letters Patent is hereby corrected as shown below:

In the Claims:

Column 15, line 66 (line 3 of Claim 8) delete "an" and replace it with: --the--.

Signed and Sealed this
Seventeenth Day of September, 2013

Teresa Stanek Rea
*Deputy Director of the United States Patent and Trademark Office*